United States Patent
Park et al.

(10) Patent No.: US 11,823,380 B2
(45) Date of Patent: Nov. 21, 2023

(54) METHODS OF IMAGE RECONSTRUCTION TO REDUCE ARTIFACTS IN RAPID CBCT SCANS

(71) Applicants: Chunjoo Park, St. Louis, MO (US); Bin Cai, St. Louis, MO (US); Sasa Mutic, St. Louis, MO (US)

(72) Inventors: Chunjoo Park, St. Louis, MO (US); Bin Cai, St. Louis, MO (US); Sasa Mutic, St. Louis, MO (US)

(73) Assignee: Washington University, St. Louis, MO (US)

(*) Notice: Subject to any disclaimer, the term of this patent is extended or adjusted under 35 U.S.C. 154(b) by 318 days.

(21) Appl. No.: 17/187,648

(22) Filed: Feb. 26, 2021

(65) Prior Publication Data

US 2021/0264591 A1  Aug. 26, 2021

Related U.S. Application Data

(60) Provisional application No. 62/981,723, filed on Feb. 26, 2020.

(51) Int. Cl.
- *G06T 7/00* (2017.01)
- *G06T 7/11* (2017.01)
- *G06T 11/00* (2006.01)

(52) U.S. Cl.
CPC ............. *G06T 7/0012* (2013.01); *G06T 7/11* (2017.01); *G06T 11/008* (2013.01); *G06T 2207/10081* (2013.01); *G06T 2207/20081* (2013.01)

(58) Field of Classification Search
CPC ................................ G06T 7/11; G06T 11/008
See application file for complete search history.

(56) References Cited

U.S. PATENT DOCUMENTS

| | | | |
|---|---|---|---|
| 7,283,604 B2 | 10/2007 | De Man | |
| 2016/0300343 A1* | 10/2016 | Gazit | G06T 7/0014 |
| 2016/0324499 A1* | 11/2016 | Sen Sharma | A61B 6/5258 |
| 2019/0311505 A1 | 10/2019 | Helm et al. | |

OTHER PUBLICATIONS

U. Heil, D. Gross, R. Schulze, U. Schwanecke and E. Schömer, "Metal artifact reduction in x-ray computed tomography: Inpainting versus missing value," 2011 IEEE Nuclear Science Symposium Conference Record, Valencia, Spain, 2011, pp. 2675-2677, doi: 10.1109/NSSMIC.2011.6152788. (Year: 2011).*

* cited by examiner

*Primary Examiner* — John Villecco
*Assistant Examiner* — Courtney Joan Nelson

(57) ABSTRACT

A computer-implemented method for correcting artifacts within CT images of a subject includes providing iteratively correcting a CT volumetric image with a high-contrast mask by overpainting the high-contrast mask within CT volumetric image set by evaluating a model function and updating the CT projections to reflect the overpainting using a gradient descent based on previous overpainted CT projections, back-projecting the corrected CT projections to produce a corrected volumetric image set, and comparing the corrected CT volumetric image set against a previous corrected CT volumetric image set until convergence. The original voxels overpainted by the high-contrast mask are re-inserted into the converged CT volumetric image to produce the final CT volumetric image set.

7 Claims, 9 Drawing Sheets

METHODS OF IMAGE RECONSTRUCTION TO REDUCE ARTIFACTS IN RAPID CBCT SCANS

CROSS-REFERENCE TO RELATED APPLICATIONS

This application claims the benefit of priority to U.S. Provisional Application No. 62/981,723, filed on Feb. 26, 2020, the content of which is incorporated by reference in its entirety.

STATEMENT REGARDING FEDERALLY SPONSORED RESEARCH OR DEVELOPMENT

Not applicable.

MATERIAL INCORPORATED-BY-REFERENCE

Not applicable.

FIELD OF THE DISCLOSURE

The present disclosure generally relates to computed tomography (CT) imaging methods. In particular, the present disclosure relates to methods for reducing artifacts in cone-beam computed tomography (CBCT) images associated with low contrast (air pockets) and high contrast (metal) objects.

BACKGROUND OF THE DISCLOSURE

Existing high contrast/metal artifact reduction algorithms are based on projection-interpolation methods in which the projections corresponding to x-rays that pass through high contrast objects are classified as missing data to be replaced by the interpolation of neighboring projections using linear, polynomial, and wavelet multiresolution interpolation methods. Such methods are effective on large-sized metal objects where the x-rays passing through the metallic objects are minimal (i.e. mostly by scatter). However, existing projection-interpolation methods typically degrade overall reconstruction quality since the reconstruction space associated with ray trajectories that intersect with a high contrast object is characterized by highly underestimated interpolated projections.

Existing projection-interpolation reconstruction methods are similarly ill-suited when low-contrast objects, such as air pockets, are present within the field of view. By way of non-limiting example, Halcyon abdominal CBCT images that were reconstructed using projection-interpolation methods to mitigate streaks induced by moving air pockets resulted in severe distortion of the images of peripheral GI structures surrounding air pockets.

Other objects and features will be in part apparent and in part pointed out hereinafter.

SUMMARY

In one aspect, a computer-implemented method for reconstructing CT images of a subject is disclosed that includes providing a CT volumetric image set obtained from the subject and a high-contrast mask comprising voxels from high-attenuation regions within the CT volumetric image set. The method further includes combining the high-contrast mask with the CT volumetric image to produce a masked CT volumetric image set and iteratively correcting the masked CT volumetric image. The masked CT volumetric image is corrected by overpainting the high-contrast mask within the masked CT volumetric image set by evaluating a model function to produce an overpainted CT volumetric image set; forward-projecting the overpainted CT volumetric data into a projection space to produce overpainted CT projections; updating the overpainted CT projections using a gradient descent based on previous overpainted CT projections to produce corrected CT projections; back-projecting the corrected CT projections to produce a corrected volumetric image set; comparing the corrected CT volumetric image set against a previous corrected CT volumetric image set to determine if the corrected CT volumetric image set is converged; and repeating if the corrected CT volumetric image set is converged, or overpainting the high contrast mask in the corrected CT volumetric image to produce the final CT volumetric image set.

Other aspects of the disclosure are provided in additional detail below.

DESCRIPTION OF THE DRAWINGS

Those of skill in the art will understand that the drawings, described below, are for illustrative purposes only. The drawings are not intended to limit the scope of the present teachings in any way.

Figure 1:
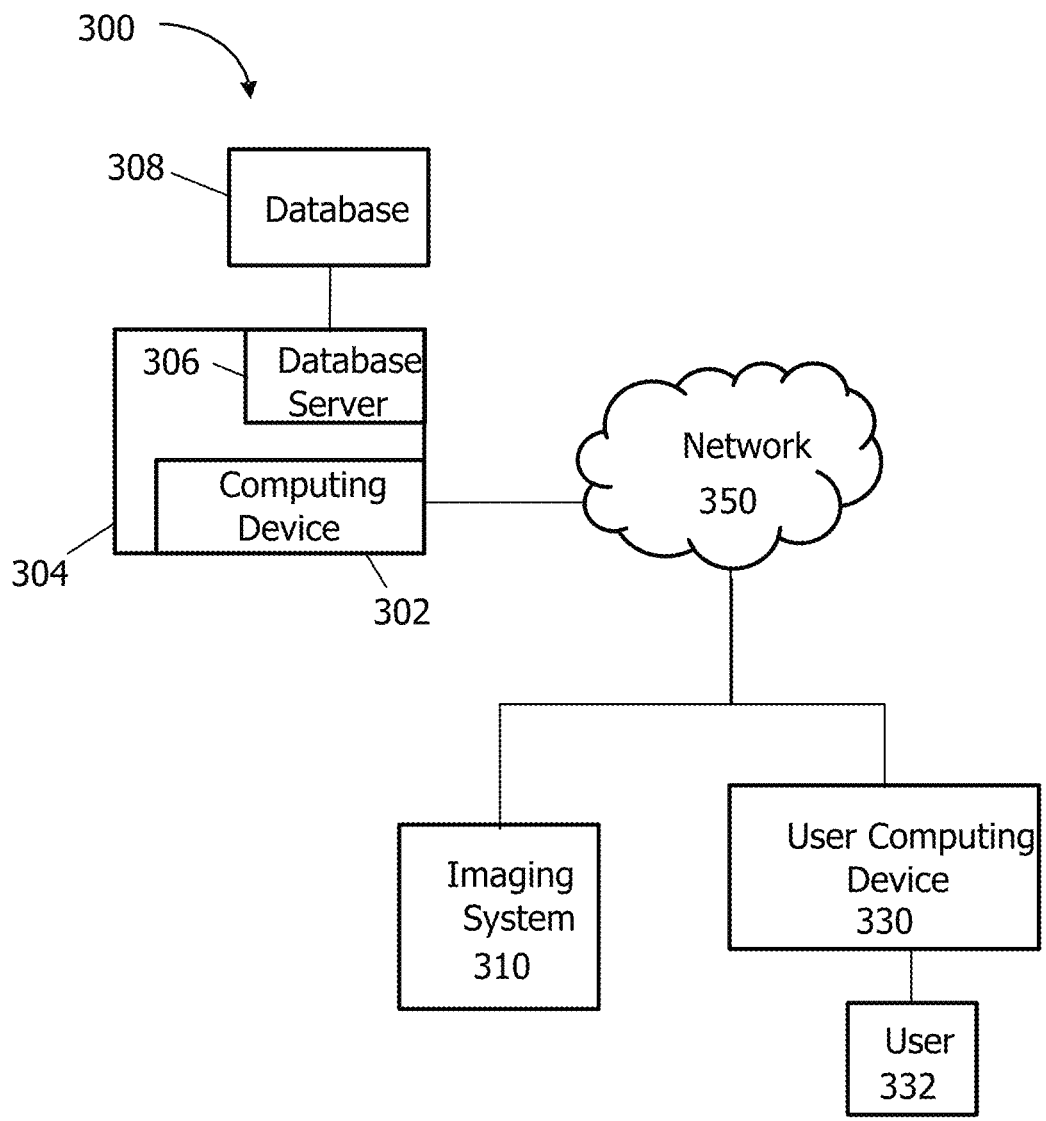
FIG. 1 is a block diagram schematically illustrating a system in accordance with one aspect of the disclosure.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

Figure 5A:
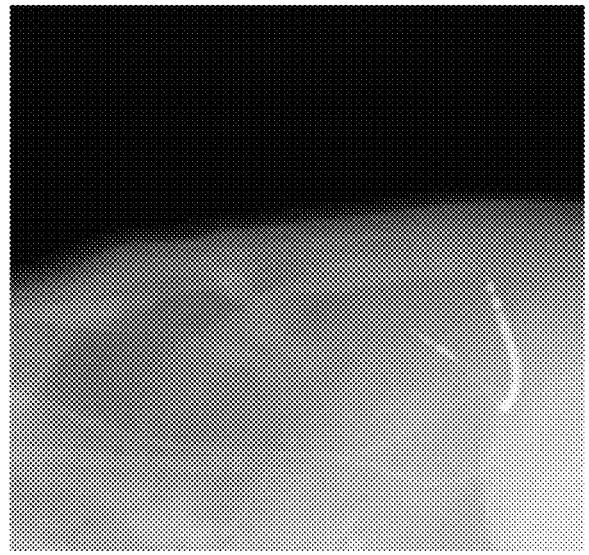
FIG. 5A is an X-ray image of a patient.
Figure 5B:
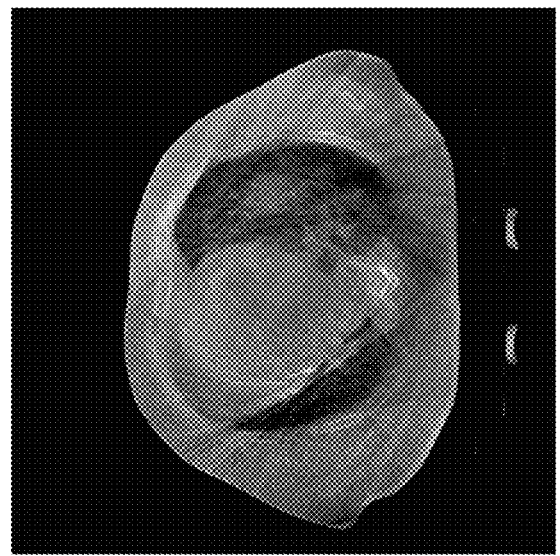
FIG. 5B is a first cone-beam computed tomography (CBCT) projection of the patient imaged in FIG. 5A.
Figure 5C:
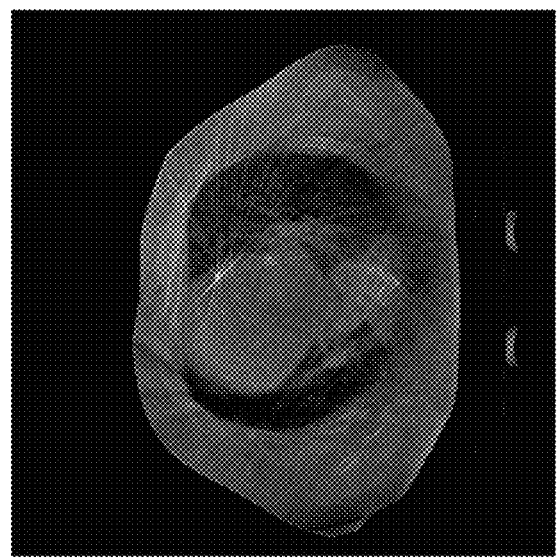
FIG. 5C is a second cone-beam computed tomography (CBCT) projection of the patient imaged in FIG. 5A.
Figure 6:
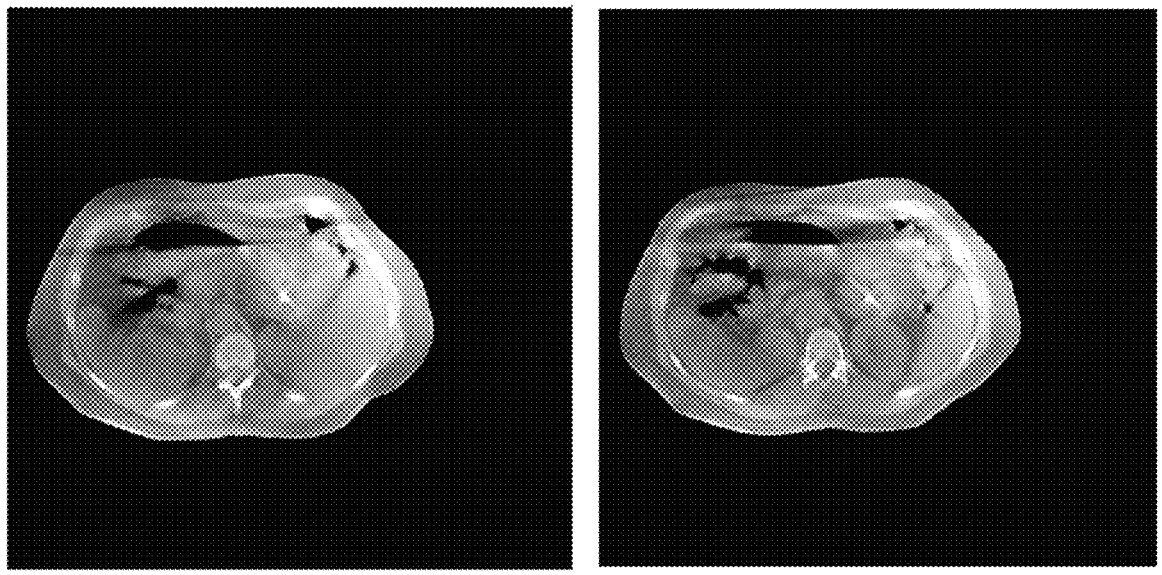
FIG. 6 contains CBCT projections of a subject that includes high-contrast regions associated with high-density and low-density objects.

In various aspects, model-based CBCT image reconstruction methods are disclosed that eliminate imaging artifacts associated with both high-contrast and low-contrast objects, resulting in CBCT images with significantly enhanced image quality relative to CBCT images reconstructed using previous methods and algorithms. The disclosed method is suitable for eliminating imaging artifacts resulting from the presence of regions within the image associated with, for example, highly-attenuating objects including, but not limited to metal objects, as well as minimally attenuating objects including, but not limited to, air pockets. FIGS. 5B and 5C are examples of CBCT reconstructed images based on conical-beam X-ray images such as the image in FIG. 5A; the reconstructed images contain artifacts associated with the presence of a metal object within a portion of the CBCT projections. FIG. 6 contains examples of CBCT reconstructed images that contain artifacts associated with the presence of air pockets within a portion of the CBCT projections.

Figure 7:
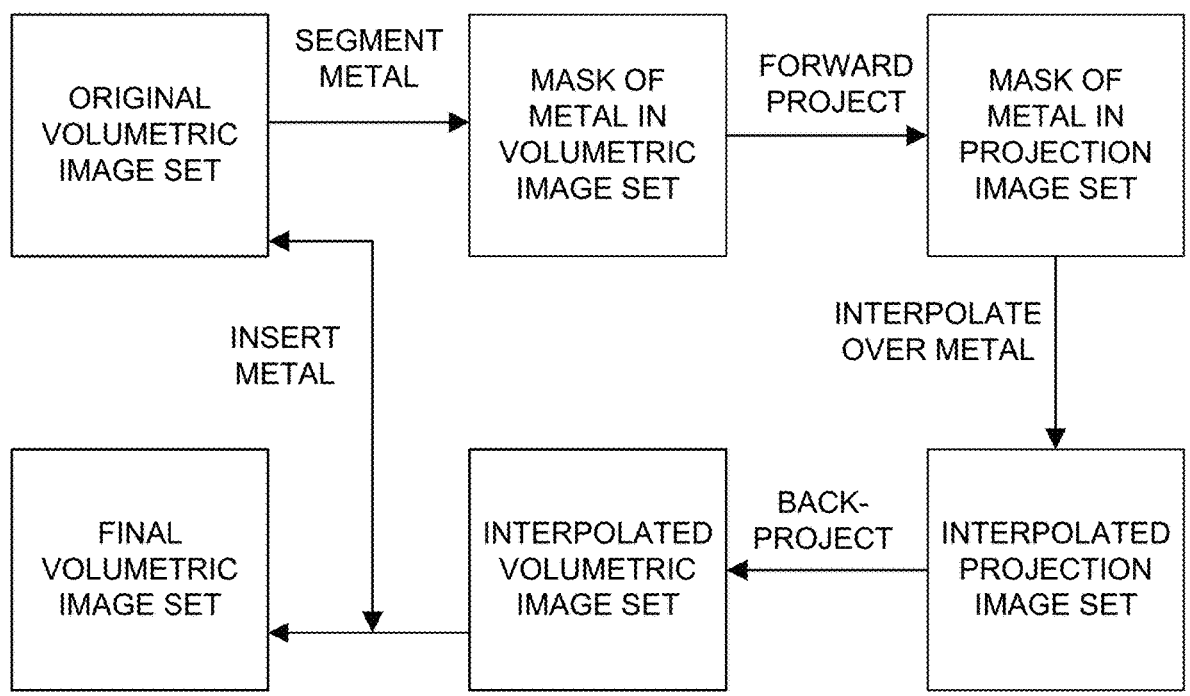
FIG. 7 is a flow chart illustrating an existing high contrast artifact reduction algorithm.

The model-based CBCT image reconstruction methods disclosed herein overcome at least some limitations of existing methods. Typically, existing methods make use of retrospective analysis of patient CBCT projections to delineate the location of high-attenuation objects, such as metal objects, from projection data. As illustrated in FIG. 7, at least some existing methods perform segmentation of high-attenuation metal objects within the original volumetric image set to produce a mask of the metal objects in the volumetric image set which is forward-projected to produce a corresponding mask of the metal objects in the projection image set. The projection data associated with the metal objects are replaced with data interpolated from adjacent/surrounding projection data to form an interpolated projection image set. After backprojecting the interpolated projection image set to form the interpolated volumetric image set, the segmented metal objects are added back into the interpolated volumetric image set to produce the final volumetric image set.

Existing methods such as the method described above are relatively effective in the context of slow and periodic motions but are not well-suited in the contexts of relatively fast-moving objects moving in unpredictable trajectories, such as implantable cardioverter defibrillators (ICDs) or pacemakers, or in the context of random or residual motions that may occur in online adaptive radiotherapy. In addition, these existing methods may result in the removal of projections containing low-density objects which may contain sufficient data for use in radiological treatments such as online adaptive radiotherapy.

The disclosed method achieves significantly enhanced image quality while maintaining reasonable reconstruction times of under about one minute. In some aspects, graphic processing unit (GPU) programming with minimal iterations is used to enable the use of CBCT imaging and the disclosed reconstruction method in busy clinical image-guided radiation therapy (IGRT) environments.

In various aspects, artifacts within CBCT images associated with high-contrast/metal objects and/or attenuating/air regions may be reduced by iterative projection-space modeling and updating of CBCT images to produce final converged CT images that are free of these artifacts. The projection-space model inpaints artifact-associated voxels to essentially tissue-equivalent contrast levels, while iteratively comparing successive back-projected images until convergence is achieved.

Figure 9:
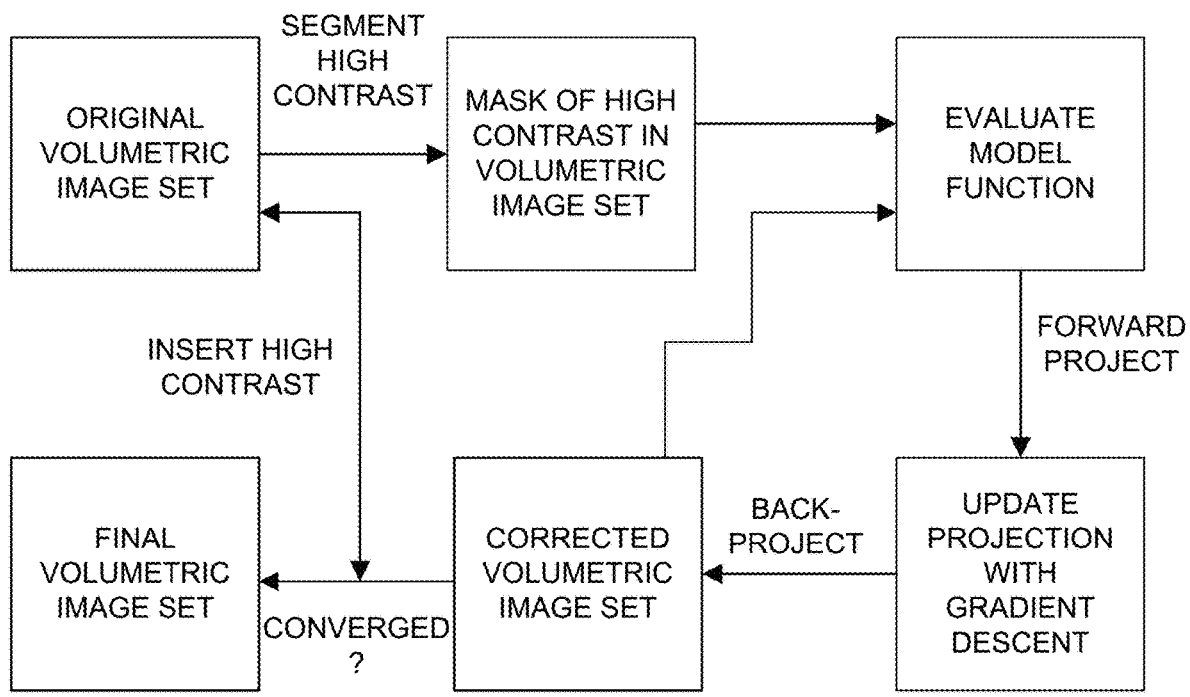
FIG. 9 is a flow chart illustrating a high contrast artifact reduction algorithm in accordance with an aspect of the disclosure.

FIG. 9 is a flowchart illustrating the steps of a method of CBCT reconstruction in one aspect. As illustrated in FIG. 9, the original volumetric image set is segmented to create a high contrast mask within the volumetric image set. In various aspects, the high contrast mask includes high contrast objects including, but not limited to, metal objects. In various aspects, this segmentation is implemented automatically using a deep learning model. In various aspects, any suitable deep learning model may be used to automatically segment the high contrast regions within the volumetric image sets without limitation. Non-limiting examples of suitable architectures for deep learning models include convolutional neural networks, fully convolutional neural networks, and any other suitable deep learning model architecture without limitation.

Figure 8:
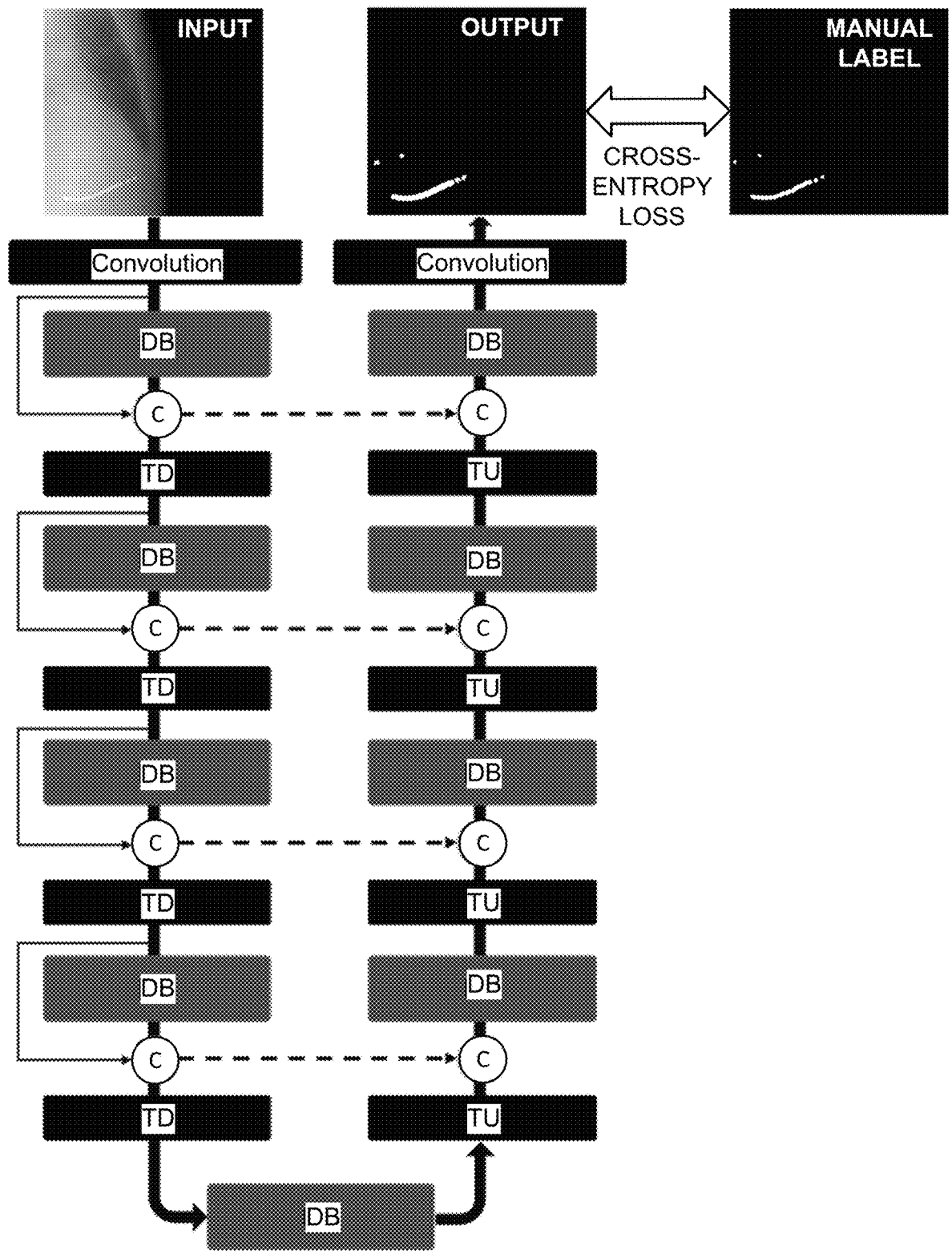
FIG. 8 is a block diagram illustrating a deep learning model to automatically segment high contrast objects within CBCT images; DB=dense block, TD=transition down, TU=transition up, C=concatenation, dashed lines indicate skip connections.

FIG. 8 is a schematic illustration of a deep learning model used to automatically segment high contrast objects within the original volumetric image set obtained during CBCT imaging in one aspect. In this aspect, the deep learning model has a modified Fully Convolutional Dense-Net (FC-DenseNet) architecture, similar to the architecture described in Jégou, Simon, et al. CVPR. 2017, the content of which is incorporated by reference herein in its entirety. As illustrated in FIG. 8, the FC-DenseNet learning model transforms an image (Input) into a high contrast mask (Output). In some aspects, the deep-learning model creates a probability map that includes two channels corresponding to image foreground and background, respectively.

Referring again to FIG. 8, the input image passes through a downsampling path (left) that includes a convolution process followed by a series of dense blocks (DB), concatenations (C), and transitions down (TD) within a downsampling path to a bottleneck, corresponding to the lowermost dense block in FIG. 8. Data from the bottleneck then passes through an upsampling path (right) that includes a convolution process followed by a series of transitions up (TU), concatenations (C), and dense blocks (DB), followed by a final concatenation to produce the high contrast mask (Output). As illustrated in FIG. 8, the downsampling path of the FC-DenseNet includes shortcut paths around each dense block. Without being limited to any particular theory, the additional connections within the network created by the shortcut paths are thought to enhance segmentation accuracy and accelerate network training. In addition, the FC-DenseNet includes skip connections (dashed arrows in FIG. 8) between concatenations in the downsampling path to corresponding concatenations in the upsampling path. Without being limited to any particular theory, the skip connections are thought to recover the losses in fine-grained information incurred by pooling along the downsampling path, thereby recovering the spatial resolution of the input image at the output high contrast mask.

In various aspects, the deep-learning model used to segment the high-contrast regions of the original volumetric image set is trained according to any suitable training method without limitation. In some aspects, the deep-learning model may be trained using a training dataset that includes a plurality of input volumetric image sets and corresponding ground-truth high-contrast masks. The ground-truth high-contrast masks include high-contrast masks based on the training volumetric image sets that are obtained using any suitable method including, but not limited to, manual labeling of volumetric images, as illustrated in FIG. 8. In various additional aspects, the output of the deep-learning model during training may be evaluated against the corresponding ground-truth masks and at least one parameter may be calculated and used as a feedback parameter for the training including, but not limited to, cross-entropy loss as illustrated in FIG. 8.

Figure 10A:
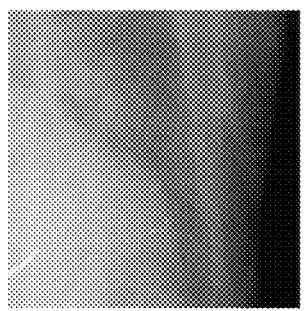
FIG. 10A is a CBCT projection that includes a high-contrast object.
Figure 10B:
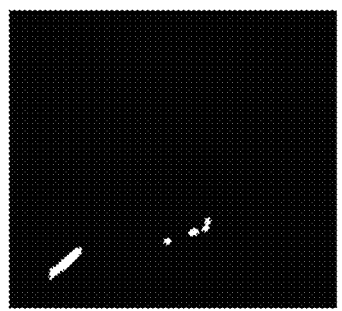
FIG. 10B is a high-contrast segmentation of the CBCT projection of FIG. 10A produced using the deep-learning model illustrated in FIG. 8.
Figure 10C:
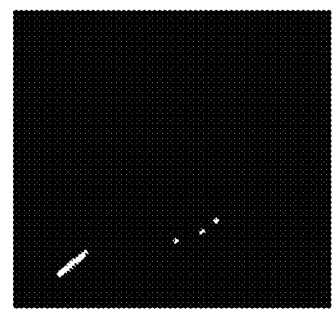
FIG. 10C is a ground-truth segmentation of the CBCT projection of FIG. 10A.

By way of non-limiting example, a training set of 850 projections and corresponding manually-labeled masks from a first subject were used to train a deep-learning model as described above and illustrated in FIG. 8. The deep-learning model was then used to segment projections from a second subject. FIG. 10A is a representative projection from the second subject, and FIG. 10B is a high-contrast mask generated by the trained deep-learning model. The model-generated mask of FIG. 10B was in close agreement with the manually-generated (ground truth) mask shown in FIG. 10C.

Referring again to FIG. 9, once the high-contrast mask is created as described above, model-based CBCT projection is used to inpaint projections of high contrast objects within the mask with tissue-equivalent contrast, while preserving the radiological information contained within each projection. Within the volumetric image set, the high contrast objects are defined according to Eqn. (1):

$$U(x, y, z) = \begin{cases} 1 & \text{for high contrast objects} \\ 0 & \text{for normal tissue} \end{cases} \quad \text{Eqn. (1)}$$

where x, y, and z represent 3-dimensional coordinates within the volumetric image space.

Within the reconstruction space x of the volumetric image set, high contrast objects and normal tissues are separated according to Eqn. (2):

$$x = U \cdot x + (1-U) \cdot x \text{ for } x \in \mathbb{R}^{m \times n \times k} \quad \text{Eqn. (2)}$$

where m, n, and k are the numbers of x, y, and z points within x, respectively.

In various aspects, a model function defined within the reconstruction space x is defined, with the goal of inpainting projections of high contrast objects with tissue-equivalent contrast, or as expressed in the reconstruction space x:

$$U \cdot x \cong \mu_{tissue} \quad \text{Eqn. (3)}$$

where $\mu_{tissue}$ denotes tissue-equivalent contrast.

Referring again to FIG. 9, the volumetric image set with the high-contrast mask is iteratively evaluated according to a model function, as expressed in Eqn. (4):

$$\min_{B} \left\| U \cdot A^T B - \mu_{tissue} \right\|_F^2 \quad \text{Eqn. (4)}$$

where B is the projection space and $A^T$ is the backprojection operator used to transform the projection space B to the reconstruction space x according to the linear relationship expressed in Eqn. (5):

$$x \cong A^T B \quad \text{Eqn. (5)}$$

Referring again to FIG. 9, after evaluation by the model function, the data in the reconstruction space x are forward-projected into the projection space B and updated using a gradient method including, but not limited to, a gradient descent method. The updated data in the projection space B are then back-projected into the reconstruction space x to produce a corrected volumetric image set. If the corrected volumetric image set is sufficiently converged, the previously-segmented high-contrast regions from the original volumetric image set are re-combined with the corrected volumetric image set to produce the final volumetric image set.

Figure 11:
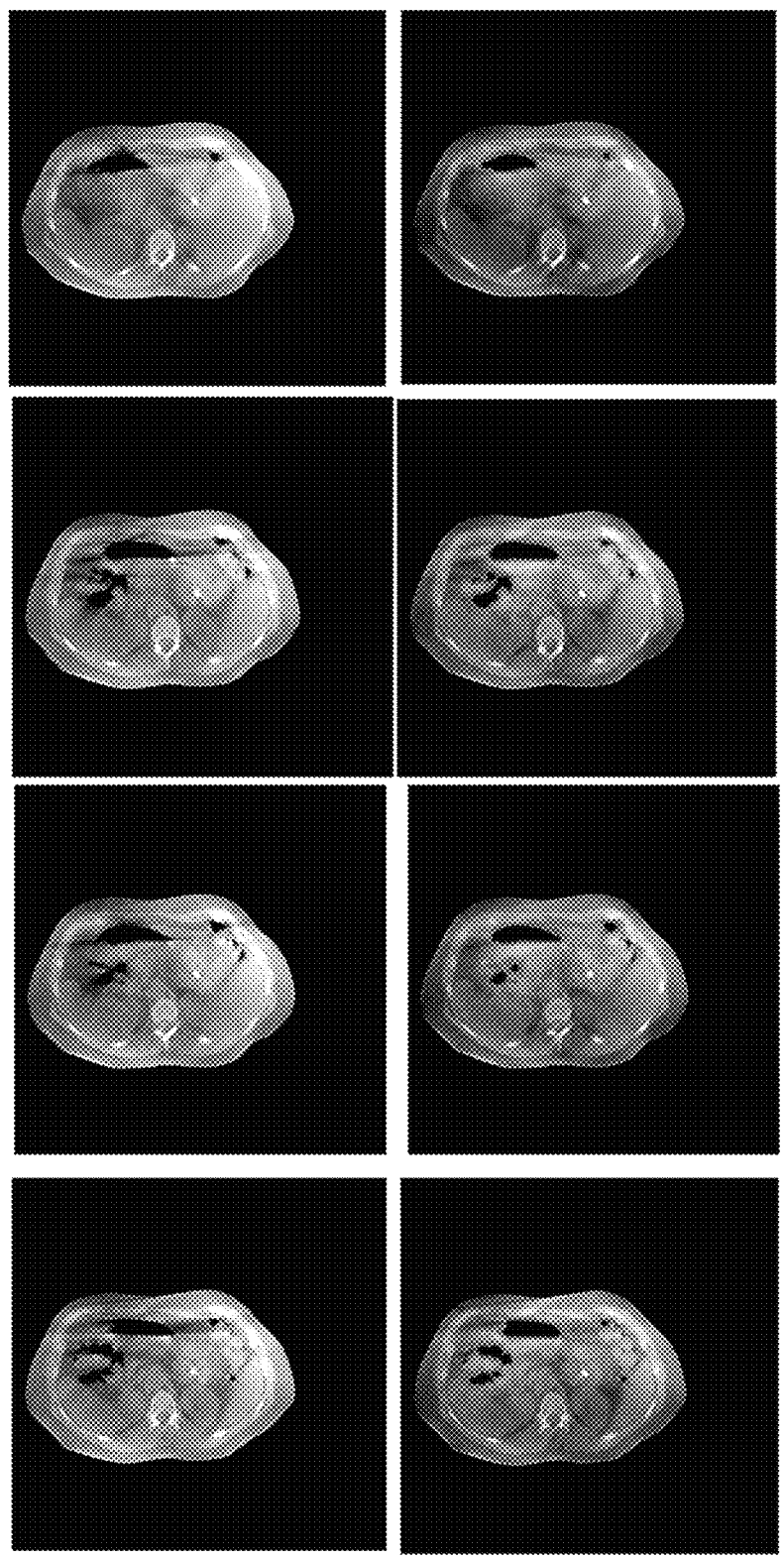
FIG. 11 contains a series of CBCT projections reconstructed with high contrast artifact reduction using the conventional FDK method illustrated in FIG. 7 (left images) and using the disclosed method illustrated in FIG. 9.

By way of non-limiting example, volumetric image sets were subjected to the disclosed method of image reconstruction and compared to volumetric image sets reconstructed using an existing FDK reconstruction method. FIG. 11 contains a series of images reconstructed using the FKD method (left) and corresponding images reconstructed using the disclosed CBCT image reconstruction methods described above. Each image reconstructed using the disclosed method exhibited reduced artifacts associated with both highly-attenuating (metal) objects, as well as minimally attenuating objects (air pockets).

As described herein, the disclosed method of CBCT image reconstruction was demonstrated to be capable of removing artifacts from air cavities due to residual motion during CBCT acquisition. Halcyon CBCT has a rapid acquisition that enables the breath-hold scan. With limited respiratory motion, the image quality is much improved over free-breathing CBCT imaging systems ad methods. However, residual motions remain in images obtained using a breath-hold scan, especially for air cavities, which occur during image acquisition and result in image artifacts. These artifacts not only reduce image quality but also prevent practitioners from producing contours on CBCT images in some cases. In various aspects, the disclosed image reconstruction method first identifies the air cavity positions in projection data, models the displacements of air cavities due to residual motion, and later removes the image artifacts in the reconstructed images.

In various aspects, the disclosed CBCT image reconstruction methods are implemented using various computing systems and devices as described below.

FIG. 1 depicts a simplified block diagram of a computing device for implementing the methods described herein. As illustrated in FIG. 1, the computing device 300 may be configured to implement at least a portion of the tasks associated with the disclosed method using the imaging system 310 including, but not limited to: operating the imaging system 310 to obtain CBCT imaging data. The computer system 300 may include a computing device 302. In one aspect, the computing device 302 is part of a server system 304, which also includes a database server 306. The computing device 302 is in communication with a database 308 through the database server 306. The computing device 302 is communicably coupled to the imaging system 310 and a user-computing device 330 through a network 350. Network 350 may be any network that allows local area or wide area communication between the devices. For example, the network 350 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user-computing device 330 may be any device capable of accessing the Internet including, but not limited to, a desktop computer, a laptop computer, a personal digital assistant (PDA), a cellular phone, a smartphone, a tablet, a phablet, wearable electronics, smartwatch, or other web-based connectable equipment or mobile devices.

Figure 2:
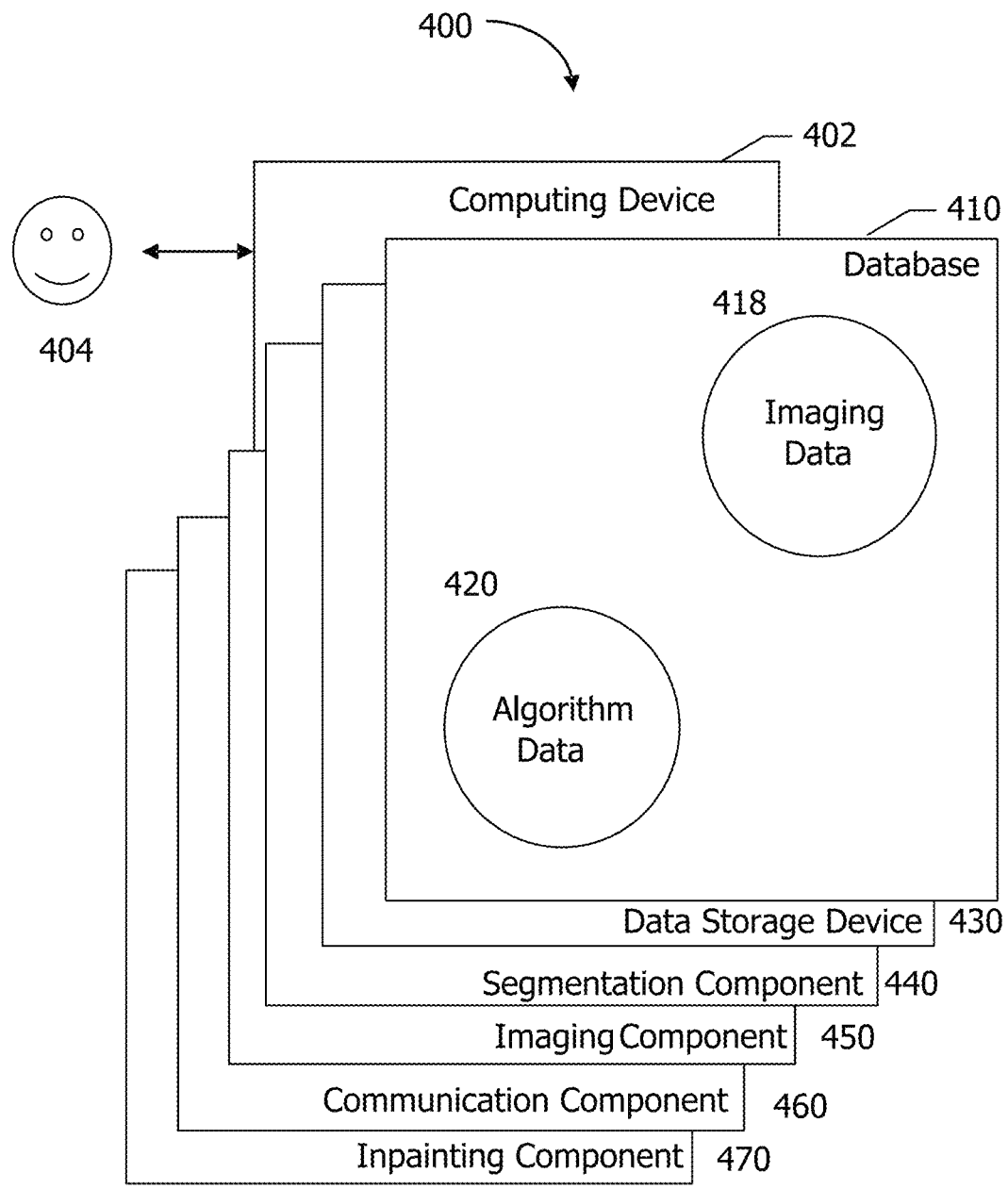
FIG. 2 is a block diagram schematically illustrating a computing device in accordance with one aspect of the disclosure.

In other aspects, the computing device 302 is configured to perform a plurality of tasks associated with obtaining nuclear medicine images. FIG. 2 depicts a component configuration 400 of computing device 402, which includes database 410 along with other related computing components. In some aspects, computing device 402 is similar to computing device 302 (shown in FIG. 1). A user 404 may access components of computing device 402. In some aspects, database 410 is similar to database 308 (shown in FIG. 1).

In one aspect, database 410 includes imaging data 418 and algorithm data 420. Non-limiting examples of suitable algorithm data 420 include any values of parameters defining the analysis of CBCT imaging data, such as any of the parameters defining the model-based projection-inpainting equations and/or machine learning networks described herein.

Computing device 402 also includes a number of components that perform specific tasks. In the exemplary aspect, the computing device 402 includes a data storage device 430, segmentation component 440, imaging component 450, communication component 460, and inpainting component 470. The data storage device 430 is configured to store data received or generated by computing device 402, such as any of the data stored in database 410 or any outputs of processes implemented by any component of computing device 402. Imaging component 450 is configured to operate or produce signals configured to operate, an imaging device to obtain CBCT imaging data, and to reconstruct the CBCT image based on the CBCT imaging data.

Segmentation component 440 is configured to operate or produce signals to automatically segment high-contrast objects within the CBCT imaging data and to produce a high-contrast mask used in subsequent inpainting of the high-contrast regions as described above. Aspects of the disclosed CBCT image reconstruction methods implemented using the segmentation component 440 including, but are not limited to, training and implementation of a deep-learning model as described above to transform CBCT images into high-contrast masks.

Inpainting component 470 is configured to perform the inpainting of regions within the high-contrast mask as described above to reduce associated image artifacts. Aspects of the disclosed CBCT image reconstruction methods implemented using the inpainting component 470 including, but are not limited to, iterative updating of the volumetric image data using a model function as described above.

The communication component 460 is configured to enable communications between computing device 402 and other devices (e.g. user computing device 330 and imaging system 310, shown in FIG. 1) over a network, such as network 350 (shown in FIG. 1), or a plurality of network connections using predefined network protocols such as TCP/IP (Transmission Control Protocol/Internet Protocol).

Figure 3:
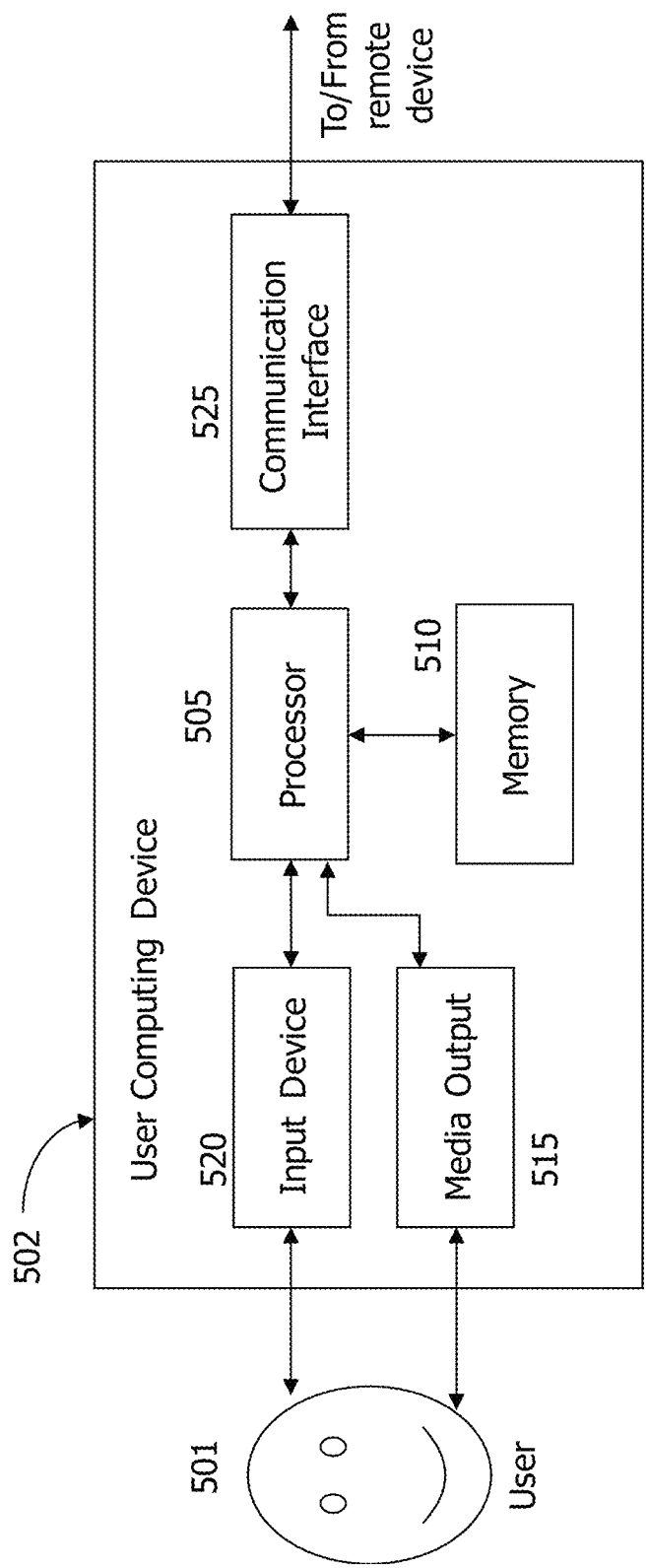
FIG. 3 is a block diagram schematically illustrating a remote or user computing device in accordance with one aspect of the disclosure.

FIG. 3 depicts a configuration of a remote or user-computing device 502, such as user computing device 330 (shown in FIG. 1). Computing device 502 may include a processor 505 for executing instructions. In some aspects, executable instructions may be stored in a memory area 510. Processor 505 may include one or more processing units (e.g., in a multi-core configuration). The memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light-emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch-sensitive panel (e.g., a touchpad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G or Bluetooth) or other mobile data networks (e.g., Worldwide Interoperability for Microwave Access (WIMAX)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 4:
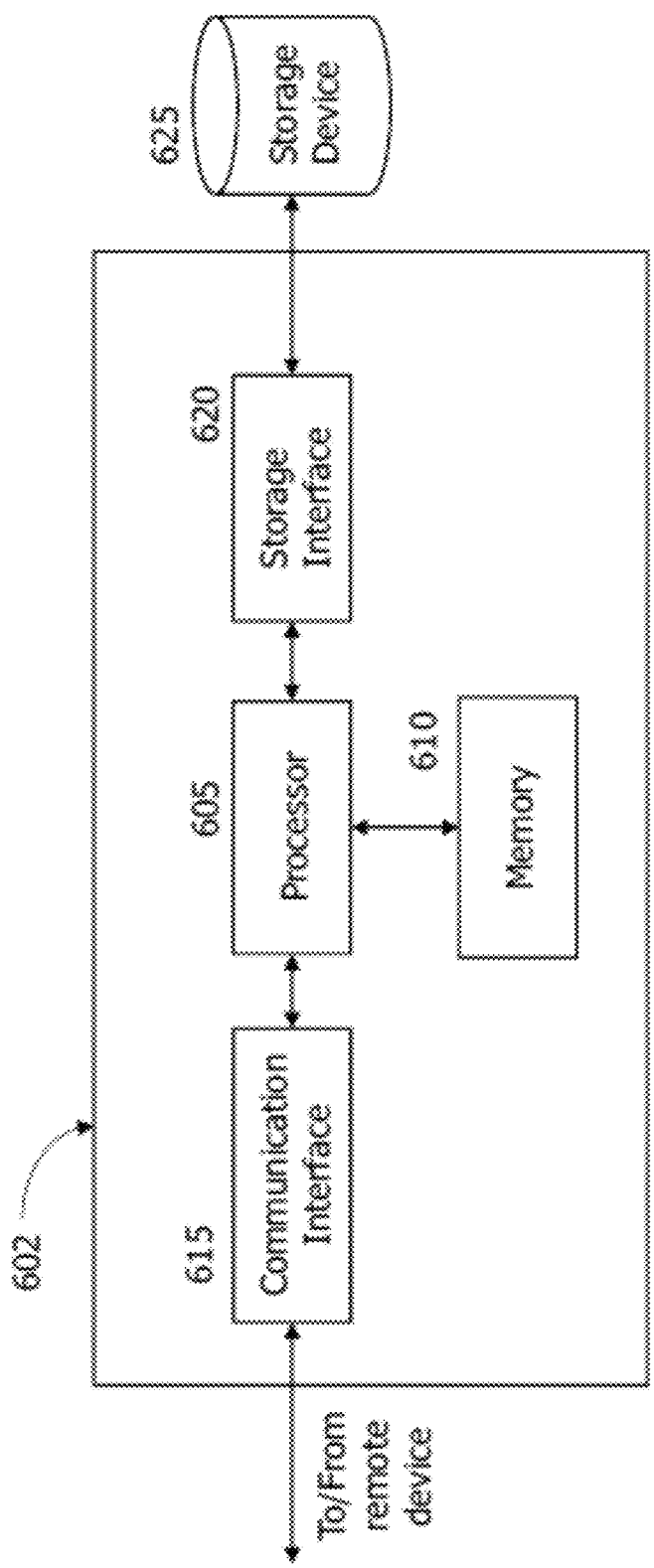
FIG. 4 is a block diagram schematically illustrating a server system in accordance with one aspect of the disclosure.

FIG. 4 illustrates an example configuration of a server system 602. Server system 602 may include, but is not limited to, database server 306 and computing device 302 (both shown in FIG. 1). In some aspects, server system 602 is similar to server system 304 (shown in FIG. 1). Server system 602 may include a processor 605 for executing instructions. Instructions may be stored in a memory area 625, for example. Processor 605 may include one or more processing units (e.g., in a multi-core configuration).

Processor 605 may be operatively coupled to a communication interface 615 such that server system 602 may be capable of communicating with a remote device such as user computing device 330 (shown in FIG. 1) or another server system 602. For example, communication interface 615 may receive requests from the user computing device 330 via a network 350 (shown in FIG. 1).

Processor 605 may also be operatively coupled to a storage device 625. Storage device 625 may be any computer-operated hardware suitable for storing and/or retrieving data. In some aspects, storage device 625 may be integrated in server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid-state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 3) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer-executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, artificial neural networks include, but are not limited to, convolutional neural networks. Non-limiting examples of suitable convolutional neural networks include Fully Convolutional Dense-Net (FC-DenseNet) networks. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function that maps outputs to inputs and utilize the predictive function to generate ML outputs based on data inputs. The example inputs and example outputs of the training data may include any of the data inputs or ML outputs described above.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship.

In yet another aspect, ML methods and algorithms are directed toward reinforcement learning, which involves optimizing outputs based on feedback from a reward signal. Specifically, ML methods and algorithms directed toward reinforcement learning may receive a user-defined reward signal definition, receive data input, utilize a decision-making model to generate an ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, an ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving media, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a server computer. In a further aspect, the system is being run in a Windows® environment (Windows is a registered trademark of Microsoft Corporation, Redmond, Wash.). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independently and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

The above non-limiting examples are provided to further illustrate the present disclosure. It should be appreciated by those of skill in the art that the techniques disclosed in the examples represent approaches the inventors have found function well in the practice of the present disclosure and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

What is claimed is:

1. A computer-implemented method for correcting artifacts within CT images of a subject, the method comprising:
   a. providing a CT volumetric image set obtained from the subject;
   b. providing a high-contrast mask comprising voxels from high-attenuation regions within the CT volumetric image set;
   c. combining, using a computing device, the high-contrast mask with the CT volumetric image to produce a masked CT volumetric image set; and
   d. iteratively correcting, using the computing device, the masked CT volumetric image set by:
      i. inpainting the high-contrast mask within the masked CT volumetric image set by evaluating a model function to produce an inpainted CT volumetric image set;
      ii. forward-projecting the inpainted CT volumetric data into a projection space to produce inpainted CT projections;
      iii. updating the inpainted CT projections using a gradient descent based on previous inpainted CT projections to produce corrected CT projections;
      iv. back-projecting the corrected CT projections to produce a corrected volumetric image set;
      v. comparing the corrected CT volumetric image set against a previous corrected CT volumetric image set to determine if the corrected CT volumetric image set is converged; and
      vi. repeating steps i.-v. if the corrected CT volumetric image set is converged, or inpainting the high contrast mask in the corrected CT volumetric image to produce the final CT volumetric image set.

2. The method of claim 1, wherein the model function comprises:

$$\min_B \|U \cdot A^T B - \mu_{tissue}\|_F^2,$$

wherein U represents the high-contrast mask, U=1 for high-contrast voxels and U=0 for all other voxels within the CT volumetric image data, B represents the CT projections, $A^T$ represents a backprojection operation x≅$A^T$B, x represents the CT volumetric image data, and $\mu_{tissue}$ represents a tissue-equivalent contrast.

3. The method of claim 1, wherein providing the high-contrast mask further comprises segmenting, using a deep learning model implemented on the computing device, high attenuation regions within the CT volumetric image set to produce the high-contrast mask.

4. The method of claim 3, wherein the deep learning network is a modified Fully Convolutional DenseNet (FC-DenseNet).

5. The method of claim 1, wherein the final CT volumetric image set comprises fewer artifacts associated with high-attenuating and minimally-attenuating regions relative to the CT volumetric image set as obtained from the subject.

6. The method of claim 5, wherein the high-attenuating regions comprise metal objects and the minimally-attenuating regions comprise air pockets within the subject.

7. The method of claim 1, wherein the CT volumetric images are CBCT images.

* * * * *